United States Patent
Pernisek et al.

(10) Patent No.: US 9,871,563 B2
(45) Date of Patent: *Jan. 16, 2018

(54) ELECTRONIC DEVICE FOR TRANSMITTING DATA BY INDUCTIVE COUPLING AND INTRACORPOREAL CURRENT

(71) Applicant: INSIDE SECURE, Meyreuil (FR)

(72) Inventors: Florian Pernisek, La Duranne (FR); Bruno Charrat, Aix-en-Provence (FR)

(73) Assignee: Inside Secure, Meyreuil (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/900,587

(22) PCT Filed: Jun. 10, 2014

(86) PCT No.: PCT/FR2014/051381
§ 371 (c)(1),
(2) Date: Dec. 21, 2015

(87) PCT Pub. No.: WO2014/207337
PCT Pub. Date: Dec. 31, 2014

(65) Prior Publication Data
US 2016/0142106 A1    May 19, 2016

(30) Foreign Application Priority Data

Jun. 24, 2013 (FR) ..................... 13 56005
Jun. 24, 2013 (FR) ..................... 13 56008

(51) Int. Cl.
*H04B 5/00*    (2006.01)
*H04B 13/00*   (2006.01)
*H02J 50/10*   (2016.01)

(52) U.S. Cl.
CPC ............ *H04B 5/0081* (2013.01); *H02J 50/10* (2016.02); *H04B 5/0018* (2013.01); *H04B 13/005* (2013.01)

(58) Field of Classification Search
CPC ...... H04B 5/0031; H04B 5/005; H04B 5/007; H04L 41/0668
(Continued)

(56) References Cited

U.S. PATENT DOCUMENTS

2010/0029203 A1    2/2010  Hebiguchi et al.
2010/0048127 A1*   2/2010  Stucki ............... G07C 9/00007
                                               455/41.1
(Continued)

FOREIGN PATENT DOCUMENTS

JP    2009232284      * 10/2009
JP    2009232284 A     10/2009
WO    2009081337 A1     7/2009

OTHER PUBLICATIONS

English Translation of International Search Report from corresponding application PCT/FR2014/051381, dated Oct. 8, 2014, 3 pages.
Non Final Office Action for U.S. Appl. No. 14/900,585, dated Oct. 5, 2016, 9 pages.
(Continued)

*Primary Examiner* — Nay A Maung
*Assistant Examiner* — Angelica M Perez
(74) *Attorney, Agent, or Firm* — Brake Hughes Bellermann LLP (57) ABSTRACT

In a general aspect, an electronic device can include a device configured to transmit data by intracorporeal current. The device configured to transmit data by intracorporeal current can include a first electrode configured to be capacitively coupled with a body of a user or capacitively coupled in an intracorporeal current conduction path of the electronic device. The electronic device can further include a circuit configured to electrically bias the first electrode. The circuit can include an electric coil arranged near the first electrode.

(Continued)

The electric coil can be configured to, in response to an alternating-current (AC) signal, generate an alternating magnetic field having field lines incident on the first electrode. The field lines incident on the first electrode can induce a current in the first electrode, where the current induces an electric field that generates an intracorporeal current.

12 Claims, 11 Drawing Sheets

(58) Field of Classification Search
USPC .......................................................... 455/41.1
See application file for complete search history.

(56) References Cited

U.S. PATENT DOCUMENTS

| | | | |
|---|---|---|---|
| 2012/0081328 A1 | 4/2012 | Kandziora et al. | |
| 2013/0278470 A1* | 10/2013 | Kataoka | H01Q 1/273 |
| | | | 343/718 |
| 2014/0023216 A1* | 1/2014 | Solum | H04R 25/554 |
| | | | 381/315 |
| 2014/0213284 A1* | 7/2014 | Yang | G01S 11/06 |
| | | | 455/456.1 |
| 2016/0142106 A1* | 5/2016 | Pernisek | H02J 50/10 |
| | | | 455/41.1 |

OTHER PUBLICATIONS

Final Office Action for U.S. Appl. No. 14/900,585, dated May 3, 2017, 12 pages.

* cited by examiner

ELECTRONIC DEVICE FOR TRANSMITTING DATA BY INDUCTIVE COUPLING AND INTRACORPOREAL CURRENT

CROSS REFERENCE TO RELATED APPLICATION(S)

This application is a 35 U.S.C. 371 National Phase Entry Application from PCT/FR2014/051381, filed Jun. 10, 2014, and designating the U.S., and also claims priority to French Application No. 1356005, filed Jun. 24, 2013, and French Application No. 1356008, filed Jun. 24, 2013, the disclosures of which are incorporated by reference herein in their entirety.

The present invention relates to an electronic device comprising means for transmitting data by intracorporeal current comprising at least one electrode intended to be capacitively coupled with the body of a subject or with the environment.

The present invention relates more particularly to "IBAN" ("Intra Body Area Network") or "PAN" ("Personal Area Networks") data transmission techniques of the type described in the European patent EP 0 824 799 and in the document "Personal Area Networks (PAN)-Near-Field Intra-Body Communication", by Thomas Guthrie Zimmerman, Massachusetts Institute of Technology, September 1995.

Figure 1:
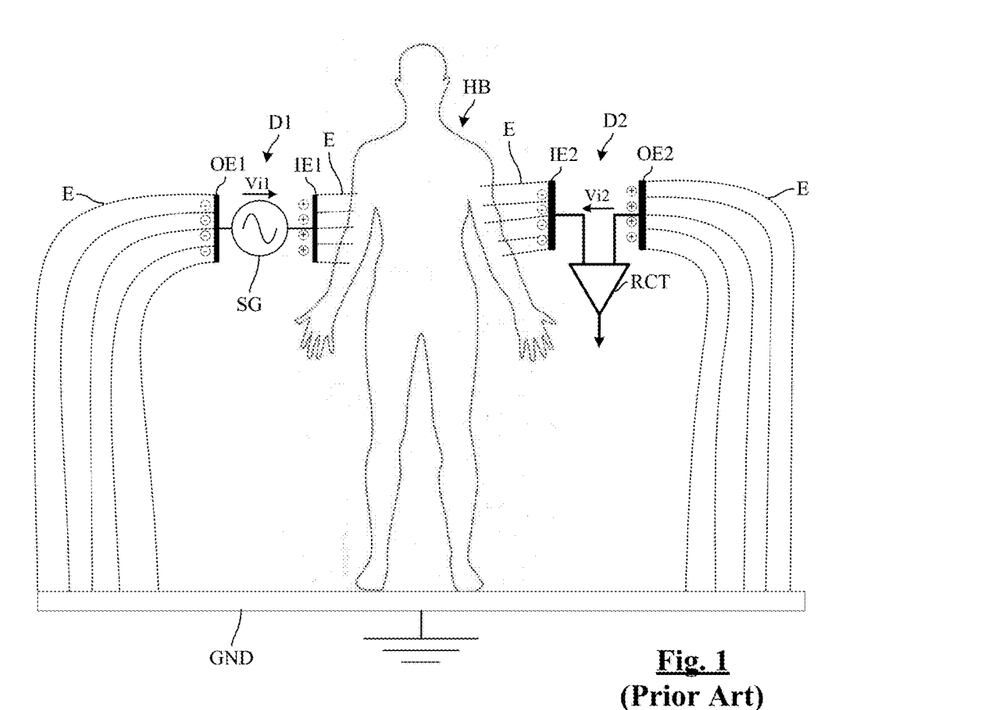
FIG. 1 described above schematically shows an IBAN system.

FIG. 1 schematically shows an IBAN data transmission system comprising a transmitter D1, a receiver D2, and the body HB of a subject. The transmitter D1 comprises an external electrode OE1, or environment electrode, an internal electrode IE1, or body electrode, and a voltage generator SG coupled to the two electrodes. The receiver D2 also comprises an external electrode OE2 and an internal electrode IE2.

The generator SG of the transmitter D1 creates an oscillating potential Vi1 between the electrodes OE1, IE1. An electric field E forms between the internal electrode IE1 and the body HB of the subject, and between the external electrode OE1 and the environment. The body HB is considered to be a large capacitor plate which can be charged and discharged by the transmitter D1. The environment is schematically represented by the floor, and has a reference potential considered as forming the ground GND of the IBAN system. The electric charge applied to the body of the subject gives it a potential different from that of the environment, which causes the appearance of an electric field E between the body and the environment and between the body and the receiver D2. A voltage Vi2 appears on the electrode IE2 of the receiver D2. A receiver circuit RCT measures the voltage Vi2, relative to the potential of the external electrode OE2.

Figure 2:
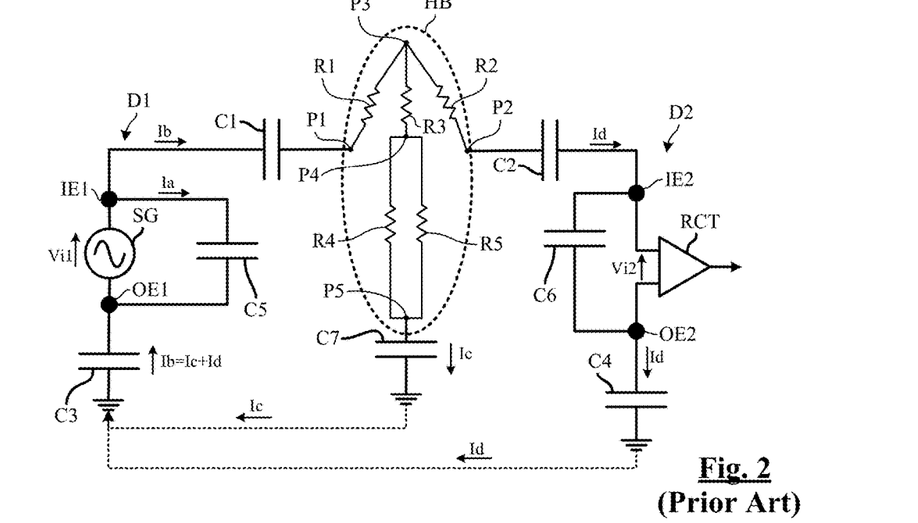
FIG. 2 described above is an equivalent wiring diagram of the IBAN system in FIG. 1, FIG. 3 described above shows an example of IBAN application, FIG. 4 described above shows an example of NFC application.

FIG. 2 is a representation of the IBAN system of FIG. 1 in the form of a capacitive and resistive electric network. A capacitor C1 represents the capacitive coupling between the internal electrode IE1 of the device D1 and a zone of the body the most proximate to this electrode, schematically represented by a point P1. A capacitor C2 represents the capacitive coupling between the internal electrode IE2 of the device D2 and a zone of the body the most proximate to this electrode, schematically represented by a point P2. A capacitor C3 represents the capacitive coupling between the external electrode OE1 of the device D1 and the environment. A capacitor C4 represents the capacitive coupling between the external electrode OE2 of the device D2 and the environment. A capacitor C5 represents the capacitive coupling between the electrodes OE1 and IE1. A capacitor C6 represents the capacitive coupling between the electrodes OE2 and IE2, and a capacitor C7 represents the capacitive coupling between the feet and the environment. Other coupling capacitors featured in the model of the Massachusetts Institute of Technology are not represented here for the sake of simplicity.

The body HB is considered here to be a purely resistive node schematically represented by resistors R1, R2, R3, R4, R5. The resistors R1 and R2 are in series and pass via a fictitious midpoint P3. They illustrate the total electrical resistor of the body between the points P1 and P2. Assuming for example that the user capacitively couples the devices D1 and D2 by means of its right and left hands, the resistor R1 is the resistor of the right arm and right shoulder, and the resistor R2 is the resistor of the left shoulder and left arm, the midpoint P3 being located between the two shoulders. The resistor R3 links the point P3 to a fictitious point P4 in the vicinity of the pelvis and represents the resistor of the thorax. The resistors R4 and R5 are in parallel and link the point P4 to a fictitious point P5 coupled to the environment by the capacitor C7, and represent the series resistors of the left and right legs.

When the voltage Vi1 is applied to the electrodes IE1, OE1, a current is transmitted by the voltage generator SG. A fraction Ia of this current passes through the capacitor C5 to reach the external electrode OE1, and a fraction Ib of this current passes in the body through the capacitor C1, to form an intracorporeal current. A fraction Ic of the current Ib passes through the resistor R1, the resistor R3 of the thorax and the resistors R4, R5 of the legs, then the capacitor C7, to join the external electrode OE1 of the device D1 by passing through the environment and the capacitor C3, the environment being represented by dotted lines. A fraction Id of the current Ib passes through the resistors R1, R2 and the capacitor C1 to reach the internal electrode IE2 of the device D2, then passes through the device D2 and joins the external electrode OE1 of the device D1 by passing through the environment and the capacitor C3, as also represented by dotted lines. The resistances R3+R4 or R3+R5 can be much higher than the resistance R2, and the current Ic much lower than the current Id. The intracorporeal current Id generates the voltage Vi2 at the terminals of the electrodes IE2, OE2. The latter is measured by the receiver circuit RCT, that may also be configured to measure the current Id.

To transfer data from the device D1 to the device D2, the amplitude of the voltage Vi1 is modulated by a data carrier signal. The amplitude modulation is found in the current Id and in the voltage Vi2. The device D2 demodulates the current Id or the voltage Vi2 and extracts the data it contains therefrom.

The current Id is very low, as is the voltage Vi2, which is generally of the order of one millivolt to a few millivolts. Thanks to the progress made in the field of microelectronics, integrated circuits on semiconductor chip capable of detecting a very low AC signal and of extracting a data carrier modulation signal from it are today produced, enabling IBAN applications to be implemented whereby devices located near the body can exchange data.

Figure 3:
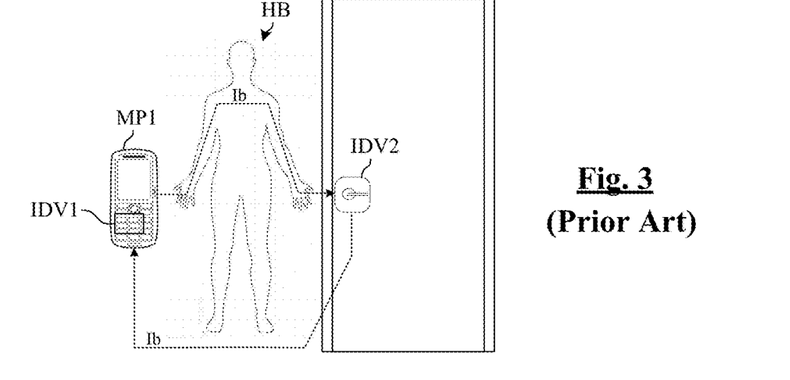

In the framework of this invention, it is planned to integrate the IBAN technology into commonly used portable electronic devices and in particular mobile telephones. FIG. 3 shows an example of intended application. A first IBAN data transmission device IDV1 is integrated into a mobile telephone MP1 and a second IBAN data transmission device IDV2 is integrated into an electronic door lock, the handle of the door comprising or forming the internal electrode of the device IDV2. When the user holding the telephone MP1 touches the handle or brings his/her hand closer to the handle, the devices IDV1, IDV2 exchange data through the intracorporeal current Ib passing through the body HB of the subject. The telephone supplies for example the device IDV2 with an authentication code necessary to unlock the door.

Therefore, it could be desirable to provide a means enabling an IBAN data transmission device to be integrated into a portable electronic object.

Still in the framework of this invention, it is also planned to integrate an IBAN data transmission device into a portable electronic object comprising a device for transmitting data by inductive coupling, or NFC device ("Near Field Communication").

Figure 4:
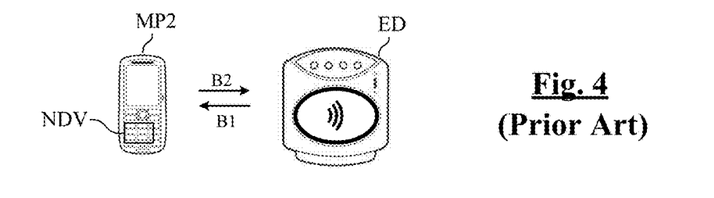

FIG. 4 schematically represents a mobile telephone MP2 comprising an NFC data transmission device NDV. The device NDV comprises an antenna coil integrated into the telephone (not represented) and is configured to exchange data by inductive coupling with an external device ED, for example an NFC reader. During the communication, the external device ED sends a magnetic field B1 which is received by the antenna coil of the device NVD. The device NVD may itself send a magnetic field B2 to send data to the external device ED.

Therefore, it could also be desirable to provide a means enabling an IBAN data transmission device to be integrated into a portable electronic object comprising a device for transmitting data by inductive coupling.

Some embodiments of the present invention relate to an electronic device comprising a device for transmitting data by intracorporeal current comprising a first electrode intended to be capacitively coupled with the body of a subject or with the environment, and a circuit for electrically biasing the first electrode, wherein the circuit for biasing the first electrode comprises an electric coil arranged near the first electrode and capable of generating, from an AC signal, an alternating magnetic field having field lines incident on the first electrode and which therein induce currents which, in turn, induce an electric field generating intracorporeal current.

According to one embodiment, the coil comprises coaxial windings around a magnetically conducting core, and has a magnetic axis parallel to the first electrode.

According to one embodiment, the device comprises a printed circuit comprising a conducting plane forming the first electrode.

According to one embodiment, the coil is mounted on a face of the printed circuit and the conducting plane extends over the same face of the printed circuit.

According to one embodiment, the first electrode is at a floating electric potential.

According to one embodiment, the first electrode forms a ground plane of the device for transmitting data by intracorporeal current.

According to one embodiment, the device for transmitting data by intracorporeal current comprises a second electrode intended to be capacitively coupled with the environment or with the body.

According to one embodiment, the second electrode is a conducting plane of a digital display.

According to one embodiment, the second electrode is coupled to a ground terminal of the device for transmitting data by intracorporeal current.

According to one embodiment, the device further comprises a device for transmitting data by inductive coupling, and the electric coil is the antenna coil of the device for transmitting data by inductive coupling.

According to one embodiment, the device for transmitting data by inductive coupling and the device for transmitting data by intracorporeal current comprise a common AC signal generator providing a first AC signal for the data transmission by intracorporeal current and a second AC signal for the data transmission by inductive coupling.

According to one embodiment, the two AC signals are of the same frequency.

According to one embodiment, the devices for transmitting data by inductive coupling and for transmitting data by intracorporeal current comprise a common amplifier for amplifying an AC signal and applying it to the antenna coil.

According to one embodiment, the device for transmitting data by inductive coupling comprises a transmitter circuit configured to supply the common amplifier with a first modulated signal carrying data to be transmitted, and the device for transmitting data by intracorporeal current comprises a transmitter circuit configured to supply the common amplifier with a modulated signal carrying data to be transmitted.

According to one embodiment, the device also comprises a radiotelephony device.

These and other features will be explained in greater detail in the following description of embodiments of devices according to the present invention, given in relation with, but not limited to the accompanying figures, in which:

FIG. 10D shows one alternative of the embodiment in FIG. 10C, FIGS. 11A, 11B respectively represent the wiring diagram and a cross-section of a second embodiment of the device in FIG. 7, FIGS. 12A, 12B, 12C respectively represent the wiring diagram, a cross-section and a top view of a third embodiment of the device in FIG. 7, FIGS. 13A and 13B respectively represent the wiring diagram and a cross-section of a fourth embodiment of the device in FIG. 7, FIGS. 14A and 14B respectively represent the wiring diagram and a cross-section of a fifth embodiment of the device in FIG. 7, FIGS. 15A and 15B respectively represent the wiring diagram and a cross-section of a sixth embodiment of the device in FIG. 7, FIGS. 16A and 16B respectively represent the wiring diagram and a cross-section of a seventh embodiment of the device in FIG. 7, FIGS. 17A and 17B respectively represent the wiring diagram and a cross-section of an eighth embodiment of the device in FIG. 7.

Figure 5:
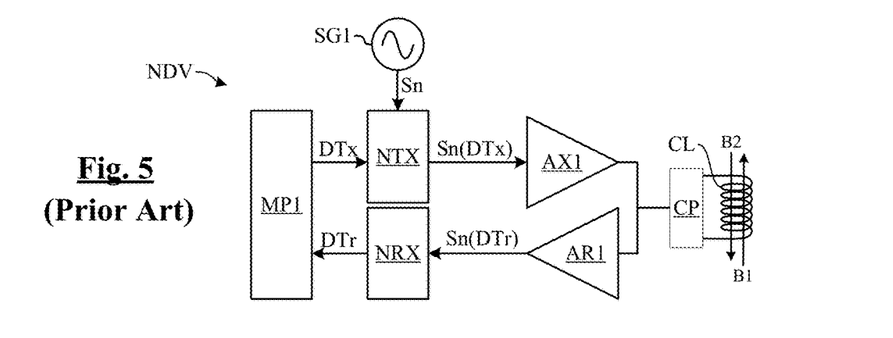
FIG. 5 shows an example of architecture of an NFC data transmission device.

FIG. 5 represents the general architecture of a conventional NFC data transmission device, of the type for example described in the previous applications EP2431925, EP2431926, EP2431927 and WO 2012/038664. The device NDV comprises a processor MP1, a transmitter circuit NTX, a receiver circuit NRX, an AC signal Sn generator SG1, a transmission amplifier AX1, a receiving amplifier AR1, and an antenna circuit. The antenna circuit comprises an antenna coil CL and antenna components CP enabling the antenna circuit to be tuned on a determined working frequency.

In data send mode, the processor supplies the transmitter circuit NTX with data DTx. The latter supplies the amplifier AX1 with a data-carrying signal Sn(DTx) which combines the AC signal Sn and data DTx, the latter possibly having been previously coded by the transmitter circuit NTX. The amplifier AX1 applies the signal Sn(DTx) to the antenna circuit, which thus generates an oscillating magnetic field B2 carrying the data DTx.

In data receive mode, an external data DTr-carrying magnetic field B1 generates in the antenna circuit an antenna signal Sn(DTr) which is extracted by the amplifier AR1 which supplies the receiver circuit NRX with it. The latter demodulates the signal Sn(DTr), extracts the data DTr from it and supplies the processor with such data.

Figure 6:
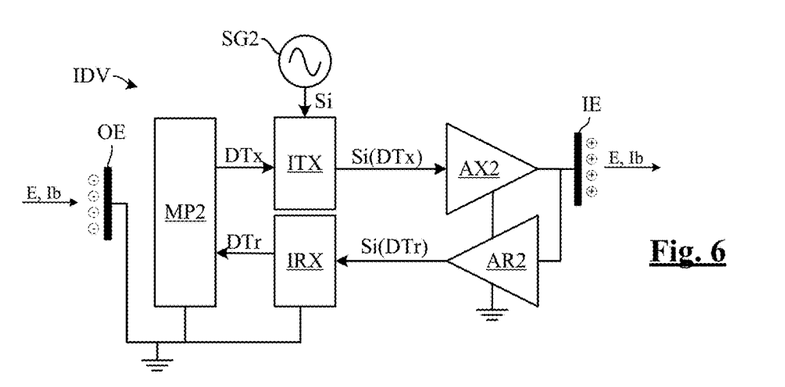
FIG. 6 shows an example of architecture of an IBAN data transmission device.

FIG. 6 represents the general architecture of an IBAN data transmission device IDV, of the type described in the French application No. 1 353 384 in the name of the applicant. The device IDV comprises a processor MP2, a transmitter circuit ITX, a receiver circuit IRX, an AC signal Si generator SG2, a transmission amplifier AX2, a receiving amplifier AR2, an external electrode OE (electrode intended to be coupled to the environment) which is coupled to the ground of the device, and an internal electrode IE (electrode intended to be coupled to the body of a subject).

In data send mode, the processor supplies the transmitter circuit ITX with data DTx. The latter supplies the amplifier AX2 with a data-carrying signal Si(DTx) which combines the AC signal Si and data DTx, the latter possibly having been previously coded by the circuit ITX. The amplifier AX2 applies the signal Si(DTx) to the electrode IE, to generate an oscillating electric field E producing the appearance of the intracorporeal current Ib described above in connection with FIG. 2, when the electrode IE is coupled to the body of the subject.

In data receive mode, an external data DTr-carrying electric field generates between the electrodes IE, OE an AC signal Si(DTr) which is detected and amplified by the receiving amplifier AR2 before being supplied to the receiver circuit IRX. The latter demodulates the signal Si(DTr) to extract the data DTr and then supplies the processor with such data.

Some embodiments of the invention aim for an IBAN-NFC data transmission device, i.e. having two operating modes, and capable, in a first operating mode, of transmitting data in NFC mode (i.e. by inductive coupling) and, in a second operating mode, of transmitting data in IBAN mode (i.e. via an intracorporeal current). More particularly, the aim is to pool elements of the devices NDV and IDV described above, so as to reduce the complexity, encumbrance and cost price of such a device, compared to a simple juxtaposition of an IBAN device and an NFC device. Such a pooling may concern different units of the devices IDV, NDV:

- the processors MP1, MP2
- the transmitter circuits NTX and ITX,
- the receiver circuits NRX and IRX,
- the generators SG1, SG2
- the interface means for sending data, respectively electrodes for an IBAN data transmission and the antenna coil for an NFC data transmission, and their associated amplifiers.

A pooling of the processors MP1, MP2 in the form of a single processor does not per se raise any particular technical problem. Concerning the transmitter circuits NTX and ITX, it will be noted that they implement data modulation and coding techniques that are generally very different. The same is true of the receiver circuits NRX and IRX. Therefore, it will be considered below that these circuits are kept in their individuality, without excluding any embodiments consisting of using transmitter or receiver circuits with two operating modes resulting from merging the circuits NTX, ITX on one hand and the circuits NRX, IRX on the other.

Concerning the generators SG1, SG2, the IBAN data transmission techniques may use carrier frequencies covering a broad range of values, from RF frequencies to UHF frequencies. Secondly, NFC data transmission techniques with an antenna coil generally use RF frequencies. More particularly, the 13.56 MHz standardized frequency is today used in NFC applications embedded in portable electronic objects.

Tests have shown that this frequency can be used for IBAN data transmissions. Therefore, provision may be made, in certain embodiments of an IBAN-NFC device according to the present invention, for a single AC signal generator used both by the transmitter/receiver circuits NTX/NRX and the transmitter/receiver circuits ITX/IRX. This signal generator may supply a single frequency signal or a signal having a first frequency during IBAN data transmissions and a second frequency during NFC data transmissions.

A specific problem that must be solved to produce an IBAN-NFC data transmission device relates to the interface means for sending data. These interface means have very different natures and comprise electrodes for an IBAN data transmission, and an antenna coil for an NFC data transmission. Each of these means requires in principle a dedicated transmission amplifier, as described above. Providing a single transmission amplifier which would be coupled, on one hand, to electrodes during an IBAN data transmission, and, on the other hand, to an antenna coil during an NFC data transmission, would involve providing complex switches, which must support high voltages, to alternatively connect the output of the transmission amplifier to one or other of these interface means.

Some embodiments of the invention aim for a simplification of these interface means and are based on the finding that an IBAN electrode can be electrically biased through a magnetic field produced by an electric coil, instead of directly receiving a bias voltage.

Figure 7:
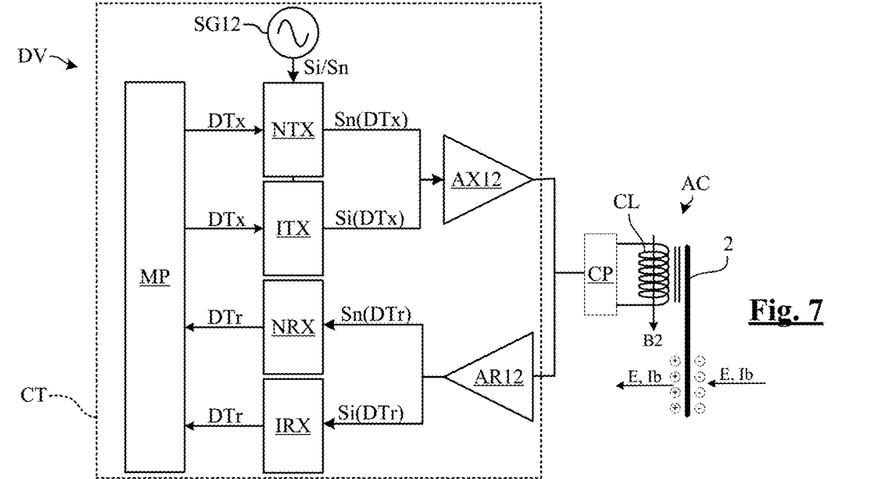
FIG. 7 shows an architecture of an IBAN-NFC data transmission device according to the present invention.

The general architecture of an IBAN-NFC data transmission device implementing this electrode bias method is represented in FIG. 7. The device DV comprises a control circuit CT, an antenna circuit AC and an electrode 2. The antenna circuit AC comprises an antenna coil CL and antenna components CP. The antenna coil AC is coupled to the electrode 2, the term "coupled" meaning that a magnetic field B2 emitted by the antenna coil CL comprises field lines incident on the electrode 2 and which generate in the latter induced currents, generally called Foucault currents. The electrode 2 is preferably very close to the antenna coil AC so that the flow of the magnetic field which generates the induced currents within the latter is as intense as possible.

The control circuit CT comprises a processor MP configured to manage two operating modes, respectively an IBAN operating mode and an NFC operating mode. It also comprises an AC signal Si/Sn generator SG12 common to the two operating modes, and transmitter NTX, ITX and receiver NRX, IRX circuits of the type described above.

During an NFC data transmission (i.e. a data transmission by inductive coupling), the generator SG12 supplies the transmitter circuit NTX with a carrier signal Sn of frequency F1, for example the 13.56 MHz standardized frequency. During an IBAN data transmission (i.e. a data transmission by intracorporeal current), the generator SG12 supplies the transmitter circuit ITX with a carrier signal Si of frequency F2. According to one embodiment, the frequencies F1 and F2 are identical and for example equal to 13.56 MHz.

The control circuit CT also comprises a transmission amplifier AX12 having an input coupled to an output of the transmitter circuit NTX and to an output of the transmitter circuit ITX, and a receiving amplifier AR12 having an output coupled to an input of the receiver circuit NRX and to an input of the receiver circuit IRX. The output of the transmission amplifier AX12 and the input of the receiving amplifier AR12 are coupled to the antenna circuit AC. The amplifier AR12 is a low noise amplifier ("LNA") having a variable gain controlled by the processor MP. Its gain in IBAN operating mode is much greater than its gain in NFC operating mode, for example 100 times more, the voltage or the current to be detected during an IBAN data transmission or receipt being very low. In one alternative embodiment, two receiving amplifiers of different gains may be provided side by side, one for the IBAN operating mode and the other for the NFC operating mode.

The link between the outputs of the transmitter circuits NTX, ITX and the amplifier AX12 may comprise a multiplexer, to isolate its outputs from one another. It is considered here for the sake of simplicity that the output of the transmitter circuit NTX has high impedance when the device operates as IBAN transmitter, and that the output of the transmitter circuit ITX has high impedance when the device operates as NFC transmitter. Similarly, a demultiplexer could be provided between the output of the amplifier AR12 and the inputs of the circuits NRX, IRX, but here such inputs are assumed to have high impedance outside the periods when one or other of these circuits is activated.

Figure 8:
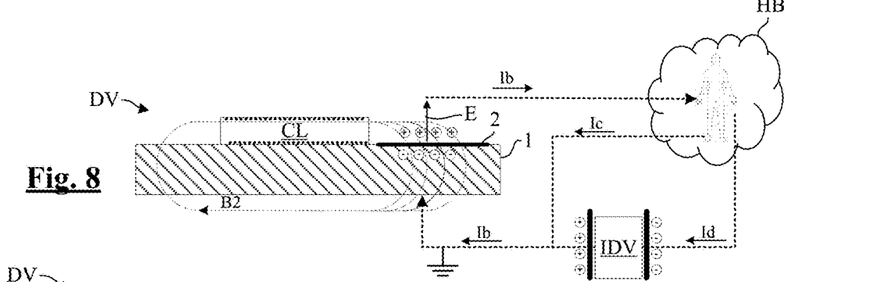
FIG. 8 is a partial cross-section of the device in FIG. 7.
Figure 9:
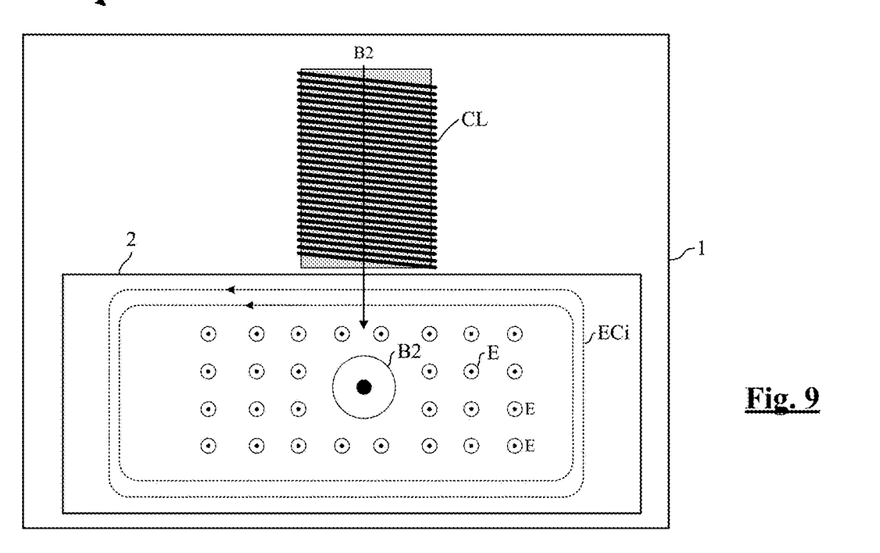
FIG. 9 is a partial top view of the device in FIG. 7, FIGS. 10A, 10B, 10C respectively represent the wiring diagram, a cross-section and a top view of a first embodiment of the device in FIG. 7.

As shown by a cross-section on FIG. 8 and a top view on FIG. 9, the electrode 2 is preferentially a conducting plane 2 of a printed circuit 1, for example made of copper. The conducting plane may be arranged on the surface of the printed circuit, as represented, or be embedded in the printed circuit. The control circuit CT is preferentially an integrated circuit on a semiconductor chip that is arranged on the printed circuit 1. The coil CL is arranged on the printed circuit and is preferentially of the type described in the application EP 2 431 925. It thus comprises coaxial windings mounted around a magnetically conducting core, for example made of ferrite, and here has a magnetic axis parallel to the plane of the printed circuit and to the conducting plane 2. Such a coil is provided for NFC applications in which the load modulation to transmit data to an NFC reader is made by emitting bursts of magnetic field that simulate a passive load modulation in the receiver circuits of the reader.

FIGS. 8 and 9 show the technical effect evoked above, enabling the antenna coil CL to be used in combination with the conducting plane 2 to implement an IBAN data transmission. The coil generates an alternating magnetic field B2 having field lines incident on the conducting plane 2 and which generate in the latter induced currents ECi, as explained above in connection with FIG. 9. These induced currents electrically bias the conducting plane 2 and generate an electric field E whereby it is possible to cause an intracorporeal current to appear when the conducting plane 2 forming the electrode is coupled to the body HB of a subject.

FIG. 8 also represents an IBAN data exchange system comprising the conducting plane 2 subjected to the magnetic field B2 emitted by the antenna coil CL, the body HB of a user, and an external IBAN device IDV. Symbols "+" and "−" symbolize the polarity of the electric field on the upper face and the lower face of the conducting plane 2, for an instantaneous value of the AC signal Si supplied by the generator SG12, for example a positive half-wave of the latter. This polarity is reversed at every half-wave of the signal Si, along with the direction of flow of the current. At the instant represented in FIG. 8, the upper face of the conducting plane 2 has a positive polarity under the effect of the induced currents, and the lower face has a negative polarity. A data DTx-carrying current Ib (flowing in the opposite direction to the flow direction of the electrons) is sent by a face of the conducting plane 2, passes through the body HB, where it is divided into a current Id and into a current Ic. The current Id passes through the external device IDV that extracts the data it comprises and returns to the conducting plane 2 through the environment. The current Ic returns to the conducting plane 2 by passing through other parts of the body and the environment.

The current Id is captured by the external IBAN device IDV. This current depends on the data DTx-carrying signal Sn, supplied by the transmitter circuit ITX to the antenna coil CL through the amplifier AX12. A demodulation of the current Id by the external device IDV thus enables the latter to receive the data DTx.

In data receive mode (data DTr), the antenna coil CL is used by the device DV to detect variations in a data-carrying electric field emitted by an external device IDV. As any conductor is sensitive to electric fields, the variations of the external electric field generate low variations in voltage at the terminals of the coil, in relation to the ground of the device. These variations are amplified by the amplifier AR12 that has a very high gain in IBAN receive mode, as indicated above. The signal thus picked up is demodulated by the receiver circuit IRX that extracts the data DTr from it.

Figure 10A:
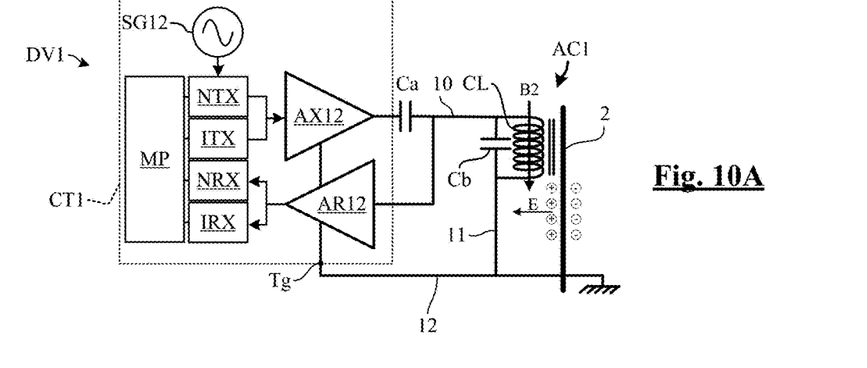
Figure 11A:
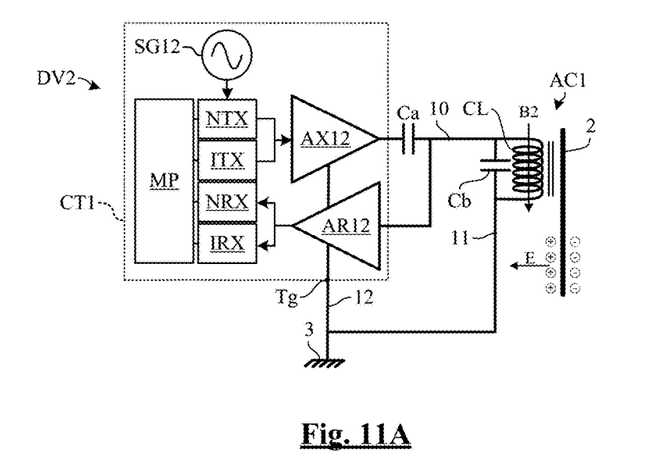

FIGS. 10A, 11A represent two embodiments DV1, DV2 of the device DV in FIG. 7. Each of the devices DV1, DV2 comprises an asymmetric antenna circuit AC1 and a control circuit CT1 identical to the control circuit CT. In the asymmetric antenna circuit AC1, a first terminal of the antenna coil CL is connected to a conducting line 10 that is coupled to the output of the amplifier AX12 through a decoupling capacitor Ca, and is connected to the input of the amplifier AR12. A second terminal of the antenna coil CL is connected to a conducting line 11 that is coupled to a ground plane of the device DV1, DV2. A tuning capacitor Cb couples the first and second terminals of the antenna coil. A ground terminal Tg of the circuit CT, to which the grounds of the amplifiers AX12, AR12 are connected, is also coupled to the ground plane via a conducting line 12.

The antenna circuit AC1 thus has a tuning frequency that varies according to the inductance of the coil CL and to the capacitances of the capacitors Ca and Cb, and this tuning frequency must be equal or close to the frequency of the excitation signals Sn or Si, or working frequency. If these two signals have different frequencies, tuning capacitors that can be selected by means of switches may be provided in the antenna circuit, to adjust its tuning frequency to the desired working frequency.

In the device DV1, the conducting plane 2 forms the ground plane of the device. The device DV2 comprises on the contrary a ground plane 3 distinct from the conducting plane 2, and the latter is left at a floating potential. In the two cases, the technical effect targeted to enable an IBAN data transmission is obtained, i.e. the appearance of an electric field E on either side of the conducting plane 2, under the effect of the magnetic field emitted by the antenna coil, in order to send an intracorporeal current.

Figure 10B:
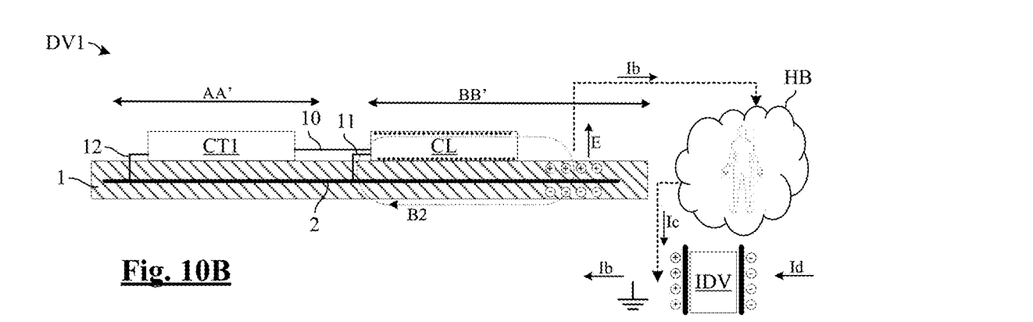
Figure 10C:
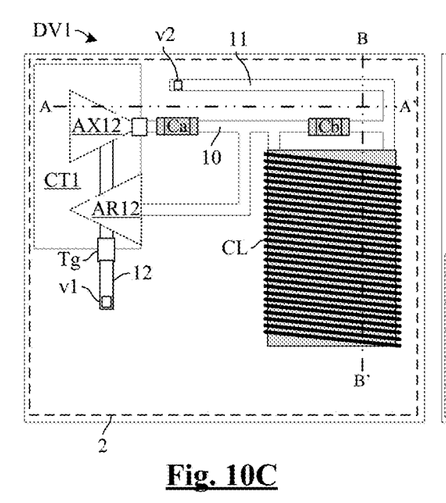

FIG. 10B is a cross-section and FIG. 10C a top view of the device DV1. The cross-section in FIG. 10B has two section axes AA' and BB' shown on FIG. 10C. As described above, the circuit CT1 is a semiconductor chip arranged on a printed circuit 1 receiving the conducting plane 2, forming here a ground plane to which the antenna coil CL is coupled via the conducting line 11, and to which the ground terminal Tg of the circuit CT is coupled via the conducting line 12. The conducting lines 10, 11, 12 are paths of the printed circuit, the paths 11 and 12 being coupled to the conducting plane 2 through conductive vias v1, v2.

Figure 11B:
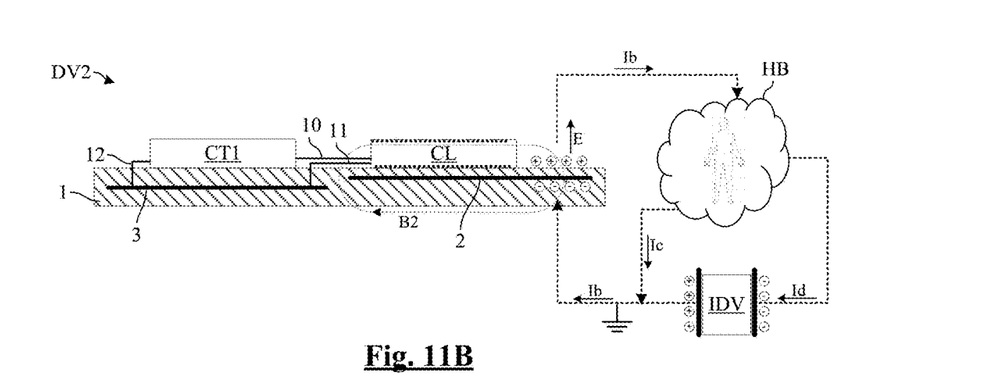

FIG. 11B is a cross-section of the device DV2. The printed circuit 1 receiving the device DV2 here comprises a conducting plane 2 at a floating potential and a ground plane 3 to which the conducting lines 11 and 12 are connected.

Figure 10D:
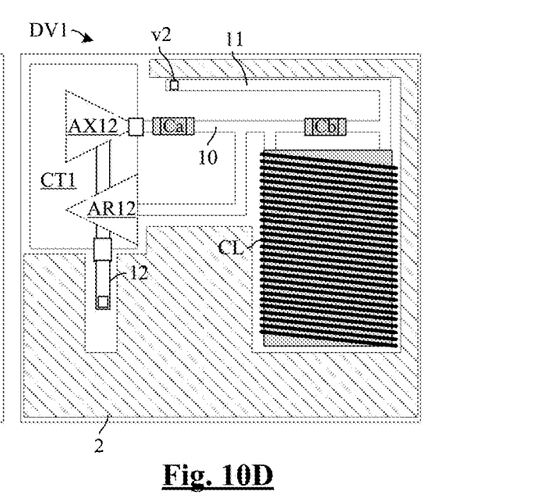

FIG. 10D is a top view of an alternative of the embodiment in FIG. 10C, in which the conducting plane 2 extends over the surface of the printed circuit, and surrounds the antenna coil CL. It will be noted that to form an IBAN electrode, the conducting plane 2 must have at least one region that is passed through by the magnetic flux emitted by the antenna coil CL, as seen more clearly on FIG. 9.

FIGS. 10B and 11B also show an IBAN data exchange system comprising the conducting plane 2 (assumed here to be subjected to the magnetic field emitted by the antenna coil CL), the body HB of a user, and an external IBAN device IDV. Symbols "+" and "−" symbolize the polarity of the electric field on each face of the conducting plane 2, for an instantaneous value of the AC signal Si supplied by the generator SG12. As described above, the conducting plane 2 sends a data-carrying current Ib that passes through the body HB, where it is divided into a current Id and into a current Ic. The current Id passes through the external device IDV that extracts the data it comprises and returns to the conducting plane 2 through the environment. The current Ic returns to the conducting plane 2 by passing through other parts of the body and the environment.

Figure 12A:
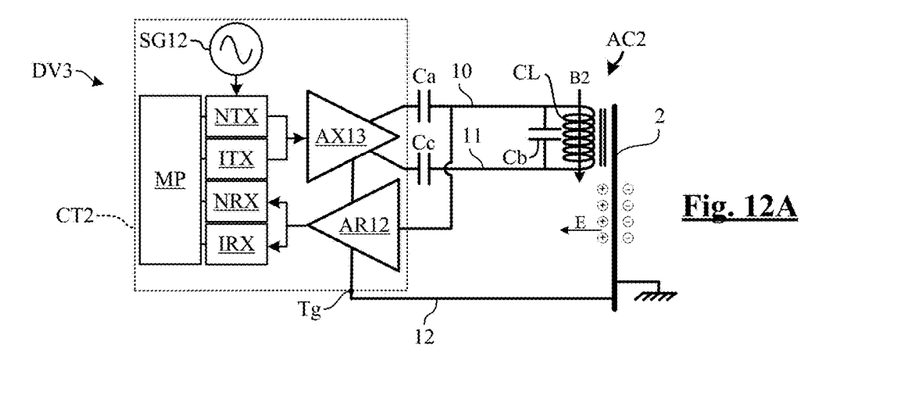
Figure 12B:
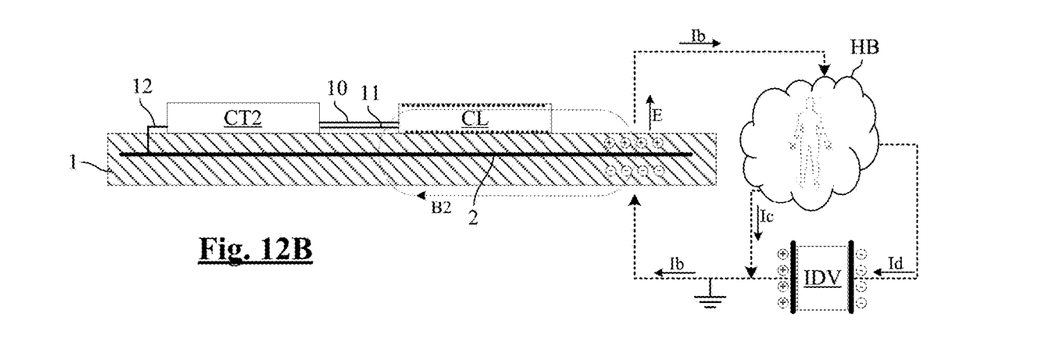
Figure 12C:
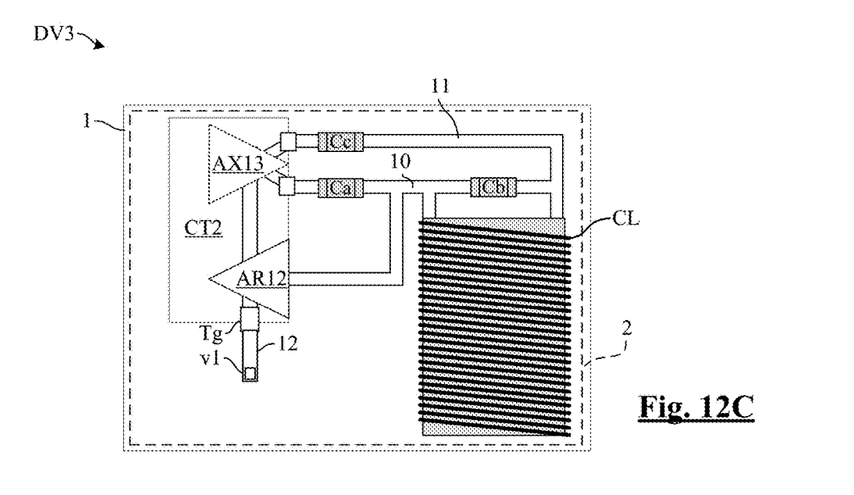

FIG. 12A is the wiring diagram of another embodiment DV3 of the device DV in FIG. 7. FIG. 12B is a cross-section and FIG. 12C a top view of the device DV3.

The circuit DV3 comprises a control circuit CT2 and an antenna circuit AC2. The control circuit CT2 differs from the control circuit CT, CT1 previously described in that the transmit amplifier AX12 is replaced with a differential transmit amplifier AX13, with two outputs. The antenna circuit AC2 is a symmetric antenna circuit which differs from the antenna circuit AC1 previously described in that the conducting line 11 connected to the first terminal of the antenna coil CL is coupled here to the second output of the amplifier AX13 through a decoupling capacitor Cc. The antenna circuit AC2 thus has a tuning frequency that varies according to the inductance of the coil CL and to the capacitances of the capacitors Ca, Cb and Cc. The conducting plane 2 is here the ground plane of the device DV3, to which the ground terminal Tg of the circuit CT2 is connected via the conducting line 12.

On FIG. 12B, the control circuit CT2 is a semiconductor wafer mounted on the printed circuit 1 in which the conducting plane 2 is embedded. On FIG. 12C, the conducting lines 10, 11, 12 are paths of the printed circuit, the path 12 being coupled to the conducting plane 2 through a conductive via v1. As indicated above, the conducting plane 1 may also be produced on the surface of the printed circuit 1.

Figure 13A:
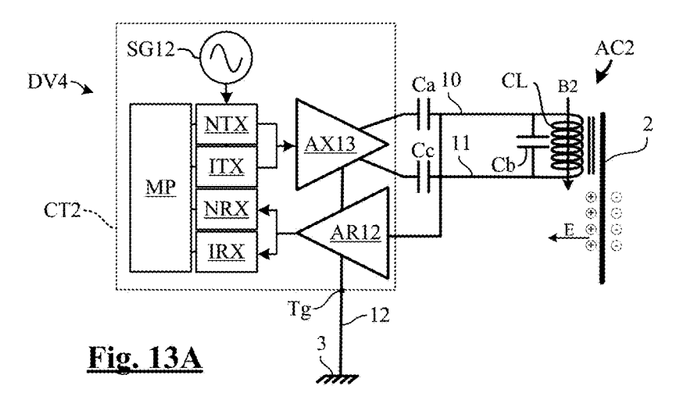
Figure 13B:
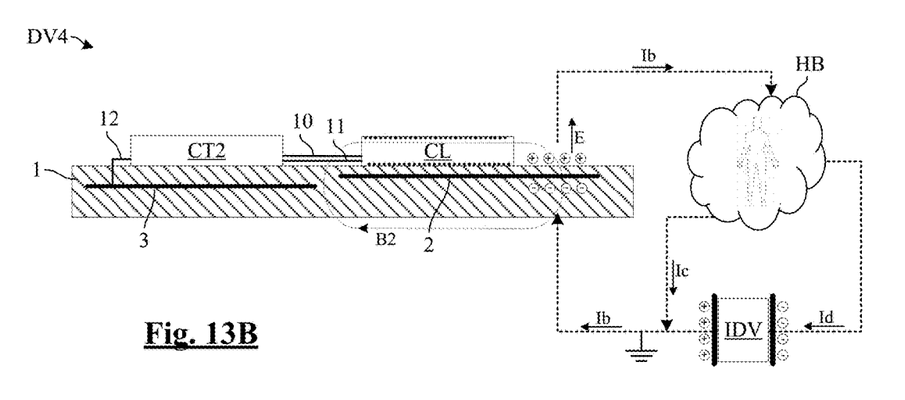

FIG. 13A is the wiring diagram of one embodiment DV4 of the device DV in FIG. 7, and FIG. 13B is a cross-section of the device DV4. The circuit DV4 comprises the control circuit CT2 and the symmetric antenna circuit AC2. It differs from the device DV3 in that the conducting plane 2 is at a floating potential. The ground terminal Tg of the control circuit CT2 is coupled to a ground 3 that is distinct from the conducting plane 2, via the conducting line 12. On the cross-section of FIG. 13B, the printed circuit 1 thus comprises two conducting planes, the conducting plane 2 that is at a floating potential and a ground plane 3 to which the conducting line 12 is connected.

FIGS. 12B and 13B also show an IBAN data exchange system comprising the conducting plane 2 forming the first electrode (assumed here to be subjected to the magnetic field emitted by the antenna coil CL), the body HB of a user, and an external IBAN device IDV. A data DTx-carrying current Ib is sent by the conducting plane 2, passes through the body HB where it is divided into a current Id and into a current Ic. The current Id passes through the external device IDV and returns to the conducting plane 2 through the environment. The current Ic returns to the conducting plane 2 by passing through other parts of the body and the environment.

A device DV and some embodiments DV1 to DV4 capable of transmitting IBAN data with only one electrode were described above. Although generally two electrodes are required in an IBAN data transmission device, so as to apply between the two electrodes an electric potential difference, the method for generating the electric field via induced currents that has just been described enables only one electrode to be used. This electrode can be part of a printed circuit on which the device is based and the integration of the IBAN data transmission device into a mobile telephone is therefore considerably simplified. Moreover, the coupling of an NFC antenna coil and of the IBAN conducting plane enables the IBAN electrode to be controlled via the NFC antenna coil, to produce a compact IBAN-NFC device at the lowest cost, using certain elements already present in an NFC data transmission device, such as the processor or the AC signal generator.

It may be desirable to perfect this IBAN-NFC data transmission device by adding a second electrode. In some embodiments, a second electrode may be produced in the printed circuit receiving the first electrode, for example on the rear face of the printed circuit. It may however be desirable to provide an inter-electrode distance that is greater than the thickness of a printed circuit, to reduce the value of the inter-electrode capacitance (capacitor C6, FIG. 2). The longer the distance is between the two IBAN electrodes, the lower the inter-electrode capacitance and the higher its impedance. Making the two electrodes as distant as possible from each other enables the electric field E to be reduced between the electrodes and to be intensified outside the electrodes, to increase its effects on the environment and in particular to increase the intensity of the intracorporeal current.

One improvement sought here thus relates to providing at the lowest cost a second IBAN electrode that is not too close to the first electrode, in the framework of an integration of the IBAN-NFC data transmission device into a mobile telephone or equivalent device.

Some embodiments of the present invention are based on the observation that portable electronic devices of mobile telephone type generally have a digital display, for example a liquid crystal display or an organic display using organic electroluminescent diodes (OLED) of OLED or AMOLED type ("Active-Matrix Organic Light-Emitting Diode"). However, such displays generally have at least one large conducting plane. Such a conducting plane is often arranged on the rear face of digital displays and is often coupled to the ground of the electronic circuit of the display, to neutralize the interfering electromagnetic radiation that the latter emits due to its high switching frequency.

Figure 14A:
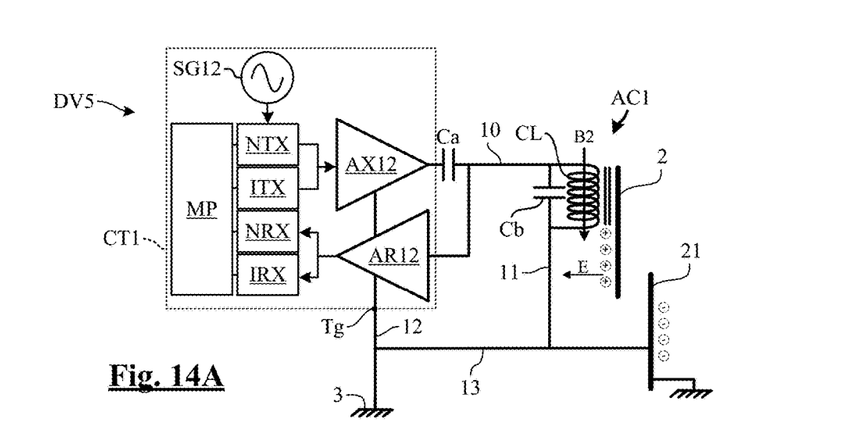

FIG. 14A is the wiring diagram of an IBAN-NFC data transmission device DV5 according to the present invention, that differs from the device DV2 in FIG. 11A in that it comprises a second IBAN electrode formed by a conducting plane 21 of a digital display. The conducting plane 2 forming the first electrode is at a floating potential whereas the ground plane 3 of the control circuit CT1, to which the ground terminal Tg of the device is connected via the conducting line 12, is connected to the conducting plane 21 of the display 20 through a conductor 13.

Figure 14B:
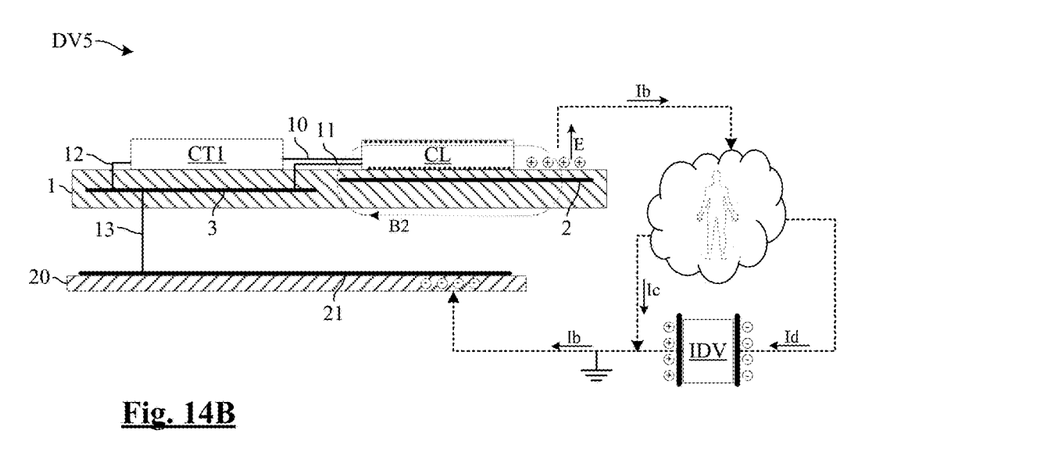

FIG. 14B is a cross-section of the device DV5. As above, the conducting plane 2 and the ground plane 3 are conducting layers of a printed circuit 1, that may be embedded (as represented) or arranged on the surface of the printed circuit. The conductor 13 that couples the ground plane 3 to the conducting plane 21 of the display is for example an electric wire or a conducting bar.

FIG. 14B also shows an IBAN data exchange system comprising the conducting plane 2 forming the first electrode (assumed here to be subjected to the magnetic field emitted by the antenna coil CL), the body HB of a user, an external IBAN device IDV, and the conducting plane 21 forming the second electrode. The symbol "+" symbolizes the polarity of the conducting plane 2 and the symbol "−" symbolizes the polarity of the conducting plane 21, for an instantaneous value of the AC signal Si supplied by the generator SG12. At the instant represented in FIG. 14B, the conducting plane 2 has a positive polarity, under the effect of the induced currents, and the conducting plane 21 has a negative polarity. A current Ib (flowing in the opposite direction to the flow direction of the electrons) is sent by the conducting plane 2, passes through the body HB, and is divided into a current Id and a current Ic. The current Id passes through the external device and returns to the conducting plane 21 through the environment (represented by the ground symbol). The current Ic joins the conducting plane 21 by passing through other parts of the body and the environment.

Those skilled in the art will note that the notions of internal electrode (the electrode capacitively coupled to the body of the subject) and of external electrode (the electrode capacitively coupled to the environment) are relative, and depend on the arrangement of the two-electrode device relative to the body. The conducting plane 2 may form the internal or external electrode, and the conducting plane 21 may form the external or internal electrode.

Figure 15A:
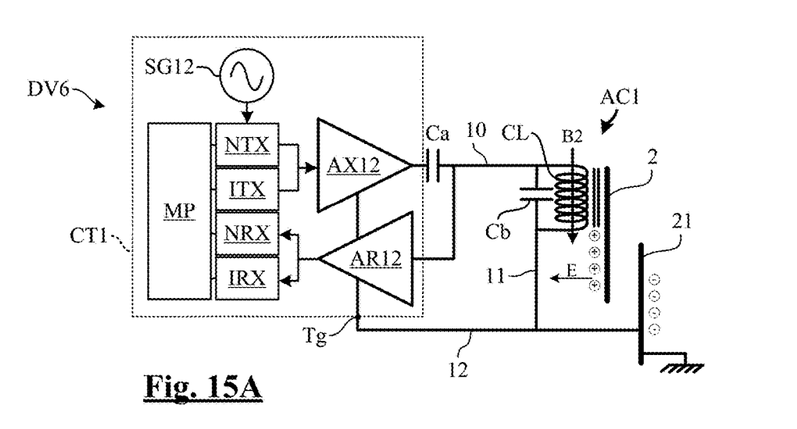
Figure 15B:
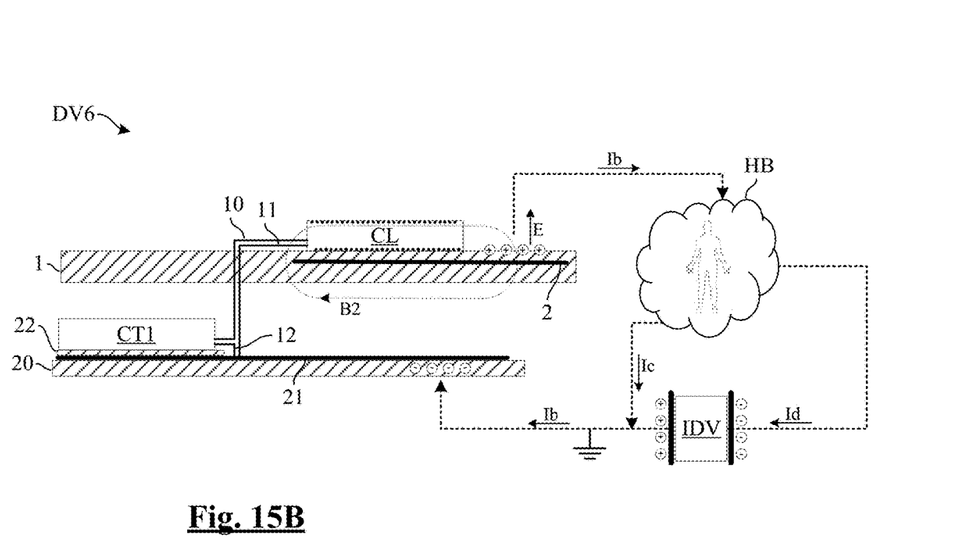

FIG. 15A is the wiring diagram and FIG. 15B a cross-section of an IBAN-NFC data transmission device DV6 according to the present invention, that differs from the device DV5 in that it does not comprise the ground plane 3. The ground terminal Tg of the control circuit CT1 is directly connected to the conducting plane 21 of the display 20 via the conducting line 12. Furthermore, as can be seen in FIG. 15B, the control circuit CT1 in the form of an integrated circuit on semiconductor chip, may, in this embodiment, be arranged on the rear face of the display 20, in a zone of the rear face receiving electronic components or on the conducting plane 21 and through an electrically insulating layer 22.

FIG. 15B also shows an IBAN data exchange system comprising the conducting plane 2 forming the first electrode (assumed here to be subjected to the magnetic field emitted by the antenna coil CL), the body HB of a user, an external IBAN device IDV, and the conducting plane 21 forming the second electrode. The network thus formed is identical to the one described in connection with FIG. 14B.

Figure 16A:
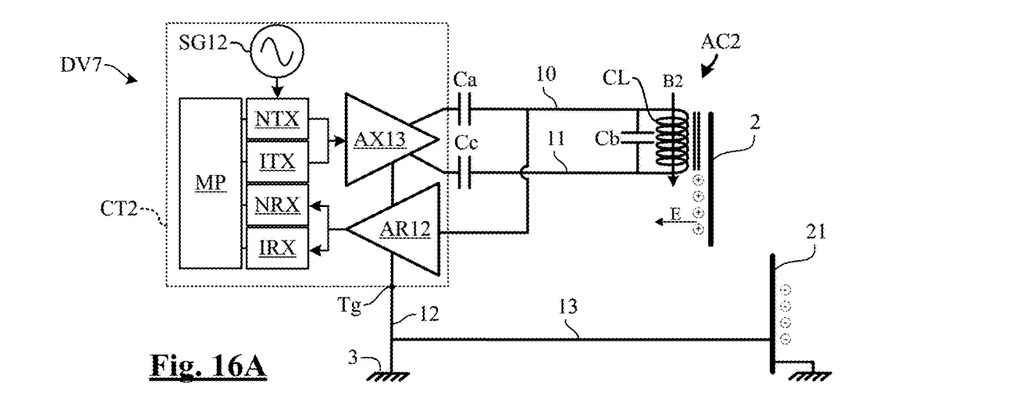

FIG. 16A is the wiring diagram of an IBAN-NFC data transmission device DV7 according to the present invention, that differs from the device DV4 in FIG. 13A in that it comprises the second electrode formed by a conducting plane 21 of a digital display. As above, the conducting plane 2 is at a floating potential, whereas the ground plane 3 of the control circuit CT1 is connected to the conducting plane 21 via the conductor 13. The ground terminal Tg of the control circuit CT2 is connected to the ground plane 3 via the conducting line 12.

Figure 16B:
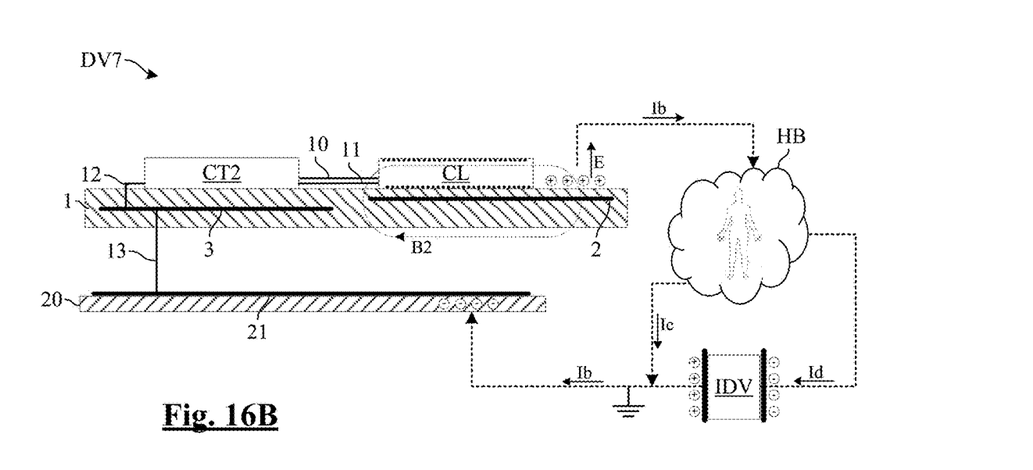

FIG. 16B is a cross-section of the device DV7 that shows the conducting plane 2 and the ground plane 3 as conducting layers of a printed circuit 1, that may be embedded (as represented) or arranged on the surface of the printed circuit. As above, the conductor 13 may be an electric wire or a conducting bar.

FIG. 16B also shows an IBAN data exchange system comprising the conducting plane 2 forming the first electrode (assumed here to be subjected to the magnetic field emitted by the antenna coil CL), the body HB of a user, an external IBAN device IDV, and the conducting plane 21 forming the second electrode. The network thus formed is identical to the one described in connection with FIG. 14B.

Figure 17A:
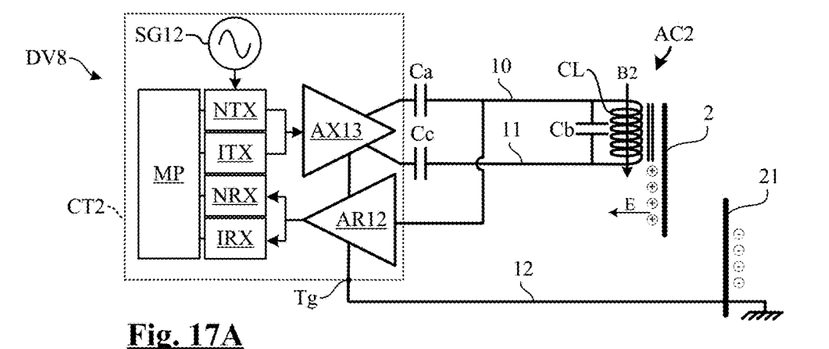
Figure 17B:
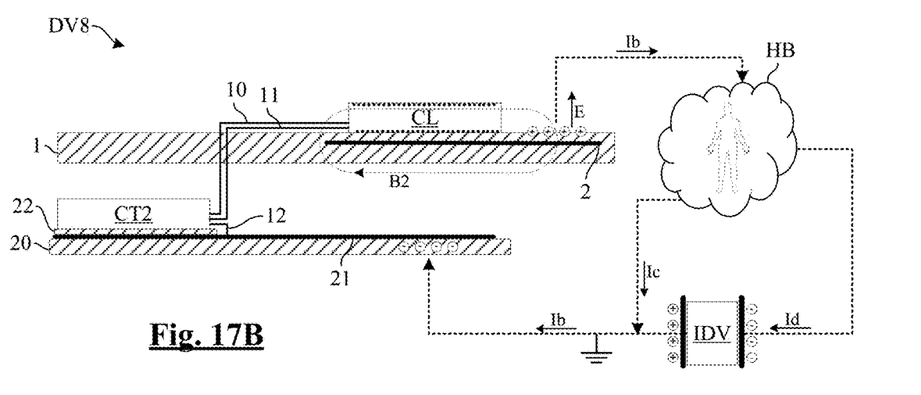

FIG. 17A is the wiring diagram and FIG. 17B a cross-section of an IBAN-NFC data transmission device DV8 according to the present invention, that differs from the device DV7 in that it does not comprise the ground plane 3. The ground terminal Tg of the control circuit CT1 is directly connected to the conducting plane 21 of the display 20 via the conducting line 12. Furthermore, as can be seen in FIG. 15B, the control circuit CT2 in the form of an integrated circuit on semiconductor chip, may, in this embodiment, be directly arranged on the rear face of the display 20, in a zone receiving components or on the conducting plane 21 through an electrically insulating layer 22.

It will be understood by those skilled in the art that this invention is susceptible of various embodiments and various other applications. For example, although the use of the conducting plane of a digital display as second IBAN electrode has been described in connection with the production of an IBAN-NFC data transmission device, this feature may also be used to produce an IBAN data transmission device devoid of the NFC functionality. Furthermore, the second electrode may take another form, for example consist of a conducting sheet arranged in the box of the device receiving the IBAN-NFC device.

Figure 18:
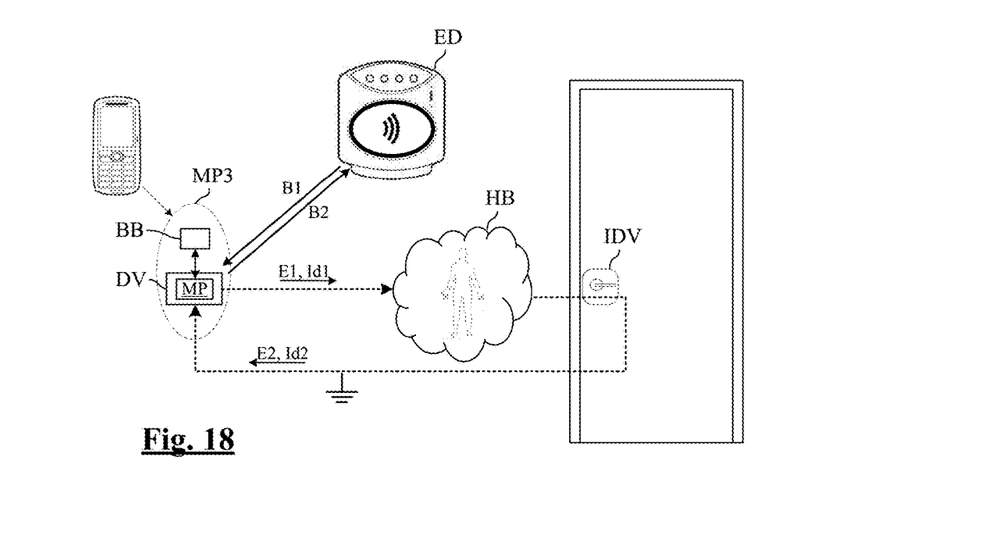
FIG. 18 shows an example of one embodiment of a portable device according to the present invention.

FIG. 18 shows a device DV (DV1 to DV8) according to the present invention, integrated into a mobile telephone MP3 comprising a main processor BB or radiotelephony "base-band processor". The main processor BB is coupled to the processor MP of the device DV to trigger NFC or IBAN applications. These applications are triggered on demand by the user or upon detecting an NFC magnetic field or an IBAN electric field, by cyclically alternating an NFC operating mode and an IBAN operating mode. By means of the device DV, the telephone may establish a communication with a remote NFC device ED, receive data through a magnetic field B1 emitted by the remote device ED, or send data by itself emitting a magnetic field B2. The telephone may also establish a communication with a remote IBAN data transmission device IDV, emit an electric field E1 and send a data-carrying intracorporeal current Id1 or receive an electric field E2 and a data-carrying intracorporeal current Id2 emitted or sent by the device DV.

The invention claimed is:

1. An electronic device comprising:
   a first device configured to transmit data by intracorporeal current, the first device including a first electrode configured to be capacitively coupled with a body of a user or capacitively coupled in an intracorporeal current conduction path of the electronic device;
   a circuit configured to electrically bias the first electrode, the circuit including an electric coil that is configured to, in response to an alternating-current (AC) signal, generate an alternating magnetic field having field lines incident on the first electrode, the field lines incident on the first electrode inducing a current in the first electrode, the current inducing an electric field that generates an intracorporeal current, the electric coil including coaxial windings around a magnetically conductive core, the electric coil having a magnetic axis parallel to a conduction plane of the first electrode, and
   a second device configured to transmit data by inductive coupling, wherein the electric coil is an antenna coil of the second device, the first device and the second device including a common AC signal generator configured to provide a first AC signal for data transmission by intracorporeal current and a second AC signal for data transmission by inductive coupling.

2. The electronic device of claim 1, further comprising a printed circuit including an electrically conductive plane, the electrically conductive plane including the first electrode.

3. The electronic device of claim 2, wherein the electric coil is mounted on a face of the printed circuit, and the electrically conductive plane extends over the face of the printed circuit on which the electric coil is mounted.

4. The electronic device of claim 1, wherein the first electrode is at a floating electric potential.

5. The electronic device of claim 1, wherein the first electrode defines a ground plane of the first device.

6. The electronic device of claim 1, wherein the first device includes a second electrode configured to be capacitively coupled in the intracorporeal current conduction path of the electronic device or capacitively coupled with the body of the user.

7. The electronic device of claim 6, wherein the second electrode is included in an electrically conductive plane included in a digital display.

8. The electronic device of claim 6, wherein the second electrode is electrically coupled with a ground terminal of the first device.

9. The electronic device of claim 1, wherein the first AC signal and the second AC signal are of a same frequency.

10. The electronic device of claim 1, wherein the first device and the second device include a common amplifier configured to:
    amplify the first AC signal or the second AC signal to generate an amplified AC signal; and
    apply the amplified AC signal to the antenna coil.

11. The electronic device of claim 10, wherein:
    the first device includes a first transmitter circuit configured to supply the common amplifier with a modulated signal carrying data to be transmitted by intracorporeal current; and
    the second device includes a second transmitter circuit configured to supply the common amplifier with a modulated signal carrying data to be transmitted by inductive coupling.

12. The electronic device of claim 1, further comprising a radiotelephony device.

* * * * *

UNITED STATES PATENT AND TRADEMARK OFFICE
CERTIFICATE OF CORRECTION

PATENT NO. : 9,871,563 B2
APPLICATION NO. : 14/900587
DATED : January 16, 2018
INVENTOR(S) : Pernisek et al.

Page 1 of 1

It is certified that error appears in the above-identified patent and that said Letters Patent is hereby corrected as shown below:

In Column 13, Line 36, Claim 1, delete "electrode, and" and insert -- electrode; and --, therefor.

Signed and Sealed this
Seventeenth Day of April, 2018

Andrei Iancu
*Director of the United States Patent and Trademark Office*